United States Patent [19]

O'Neil, II et al.

[11] Patent Number: 4,943,982
[45] Date of Patent: Jul. 24, 1990

[54] BASEBAND CARRIER PHASE CORRECTOR

[75] Inventors: Vernon P. O'Neil, II, Tempe; Jesus A. Navarro, Chandler, both of Ariz.

[73] Assignee: Motorola, Inc., Schaumburg, Ill.

[21] Appl. No.: 345,744

[22] Filed: May 1, 1989

[51] Int. Cl.⁵ .................. H03D 3/20; H04L 27/06
[52] U.S. Cl. ............................ 375/81; 329/358; 329/360; 329/363; 375/97
[58] Field of Search ............. 375/79, 81, 97, 77; 329/358, 360, 363, 340; 364/724.19, 724.07, 724.08

[56] References Cited

U.S. PATENT DOCUMENTS

| | | | |
|---|---|---|---|
| 4,253,184 | 2/1981 | Gitlin et al. | 375/14 |
| 4,306,307 | 12/1981 | Levy et al. | 375/99 X |
| 4,397,039 | 8/1983 | McAuliffe | 329/360 X |
| 4,458,355 | 7/1984 | Motley et al. | 375/99 X |
| 4,527,278 | 7/1985 | Deconche et al. | 375/97 |
| 4,816,775 | 3/1989 | Ryan | 331/12 |

Primary Examiner—Benedict V. Safourek
Assistant Examiner—Tesfaldet Bocure
Attorney, Agent, or Firm—Jordan C. Powell

[57] ABSTRACT

A baseband carrier phase corrector is disclosed which permits rapid demodulation and demodulation of varying RF input signals. The baseband carrier phase corrector receives RF signals, or alternatively, IF signals, and converts the signals to baseband. An RF signal received by the baseband carrier phase corrector is split and multiplied with oscillating signals having a 90 degree phase differential. The resultant signals are baseband in-phase (I) and quadrature (Q) signals. The I and Q signals are filtered through low pass filters. The filtered I and Q signals are multiplied within a first complex multiplier with a generated phase error. The output of the first complex multiplier results in phase adjusted I and Q baseband signals. A symbol decision circuit estimates digital I and Q signals which are the allowed symbols closest in phase to the phase adjusted I and Q baseband signals. A second complex multiplier is coupled to the symbol decision circuit and to the outputs of the low pass filters. The second complex multiplier generates a phase error by multiplying the digital I and Q signals from the symbol decision circuit with the filter and I and Q signals received from the low pass filter. This phase error is the difference in phase between the digital I and Q signals estimated in the symbol decision circuit and the filtered I and Q signals. The phase error is conjugated and relayed to the first complex multiplier as the above reference generated phase error. When the generated phase error is multiplied with the filtered I and Q signals in the first complex multiplier, the phase error portion of the I and Q signals cancel leaving phase adjusted I and Q baseband signals. When the phase error received by the first complex multiplier is zero, the carrier phase corrector has locked onto the phase and frequency of the input of signal, and the estimated digital I and Q signals are output from the carrier phase corrector.

6 Claims, 2 Drawing Sheets

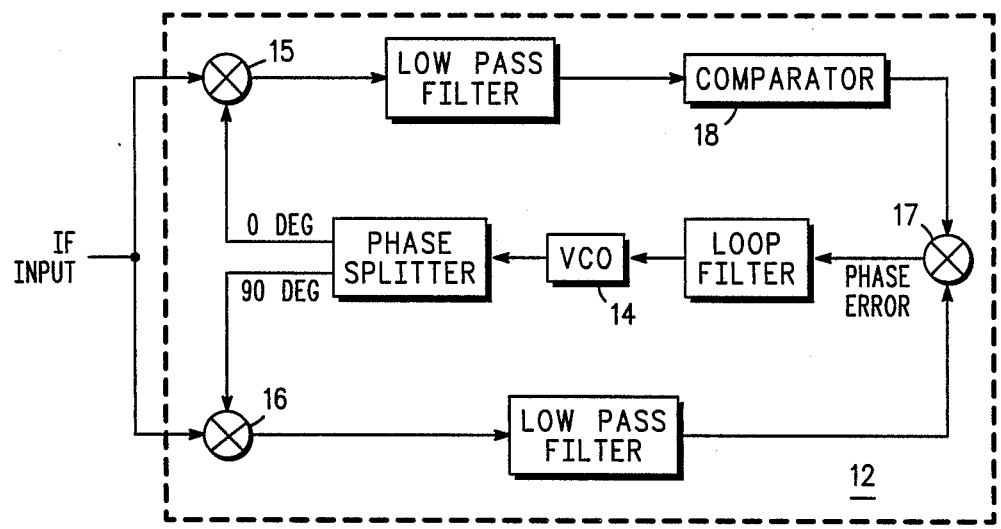
FIG. 1
FIG. 3
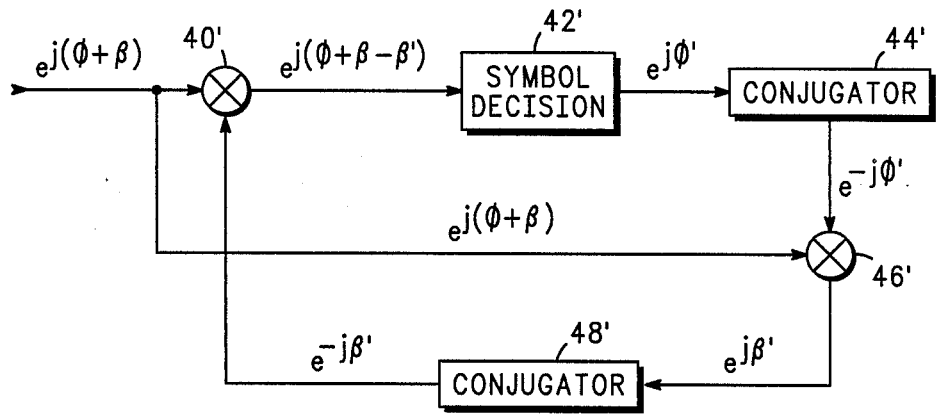

BASEBAND CARRIER PHASE CORRECTOR

This invention was made with Government support under MDA-904-87C-4114 awarded by Maryland Procurement Office (NSA). The Government has certain rights in this invention.

BACKGROUND OF THE INVENTION

This invention relates, in general, to phase modulated digital signals, and more specifically, to recovery of data from phase modulated digital signals.

Phase correction of incoming digital signals is performed through various methods including Costas loops and other phase locked loops and remodulator schemes. Nearly all of these methods generate an RF signal within a voltage controlled oscillator (VCO) and compare the VCO generated RF signal with an original carrier input signal. If the generated RF signal is out of phase with the input signal (phase error), a phase locked loop locks the frequency and phase of the generated RF signal with the frequency and phase of the input signal. The phase lock loop varies the VCO output proportional to a phase error determined within the phase locked loop. This process is the basis of the Costas loop, the "XN" loop, and the remodulator loop.

The frequency and phase of phase demodulators which incorporate phase locked loops must be adjusted to match the frequency and phase of the input signal before demodulation can occur. Therefore, relatively long periods of time are required to acquire the phase of the input carrier signal.

Time delays resulting from phase locked loop phase demodulators create serious problems with signals transmitted in short bursts (e.g. time domain multiple access (TDMA) signals). Unless the phase error is removed quickly, information within short burst signals may be lost over long acquisition time or time delays. Furthermore, time delays create high overhead in the system due to long preambles attached to the data to facilitate phase acquisition. Therefore, a shorter time period for removing phase error is desirable, and in certain circumstances, required to allow quick demodulation.

Some receiving systems require easy adjustment for reception of varying signal types (e.g. BPSK, QPSK, MSK, 8PSK), or varying data rates. Phase correctors which utilize RF processing schemes require RF bandwidth and/or special harmonic generator circuits which can be cumbersome to adjust. Baseband processors, however, incorporate low pass filters which are easy to adjust. Baseband filters are, therefore, preferable over RF and IF filters when varying RF signals are to be received.

SUMMARY OF THE INVENTION

Accodingly, it is an object of the present invention to provide a carrier phase corrector which operates at baseband and incorporates easy to adjust low pass filters.

Another object of the present invention is to provide a carrier phase corrector which substantially reduces the time required to acquire the phase of input carrier signals.

A baseband carrier phase corrector achieves the above objects of the present invention. The baseband carrier phase corrector receives RF signals, or alternatively, IF signals, and converts the signals to baseband. An RF signal received by the baseband carrier phase corrector is split and multiplied with oscillating signals having a 90 degree phase differential. The resultant signals are baseband in-phase (I) and quadrature (Q) signals. The I and Q signals are filtered through low pass filters. The filtered I and Q signals are multiplied within a first complex multiplier by a generated phase error. The output of the first complex multiplier results in phase adjusted I and Q baseband signals. A symbol decision circuit estimates digital I and Q signals which are the allowed symbols closest in phase to the phase adjusted I and Q baseband signals. A second complex multiplier is coupled to the symbol decision circuit and to the outputs of the low pass filters. The second complex multiplier generates a phase error by multiplying the digital I and Q signals from the symbol decision circuit with the filtered I and Q signals received from the low pass filter. This phase error is the difference in phase between the digital I and Q signals estimated in the symbol decision circuit and the filtered I and Q signals. The phase error is conjugated and relayed to the first complex multiplier as the above referenced generated phase error. When the generated phase error is multiplied with the filtered I and Q signals in the first complex multiplier, the phase error portion of the I and Q signals cancel leaving the phase adjusted I and Q baseband signals. When the phase error received by the symbol decision circuit is zero, the carrier phase corrector has locked onto the phase and frequency of the input of signal, and the estimated digital I and Q signals are output from the carrier phase corrector.

The above and other objects, features, and advantages of the present invention will be better understood from the following detailed description taken in conjunction with the accompanying drawings.

BRIEF DESCRIPTION OF THE DRAWINGS

FIG. 1 is a schematic diagram of a Costas loop phase corrector incorporating a phase locked loop.

FIG. 3 is a schematic diagram of the baseband carrier phase corrector of FIG. 2 showing the mathematics of the operation for both the in-phase (I) and quadrature (Q) channels of the baseband phase corrector.

DETAILED DESCRIPTION OF THE INVENTION

Figure 2:
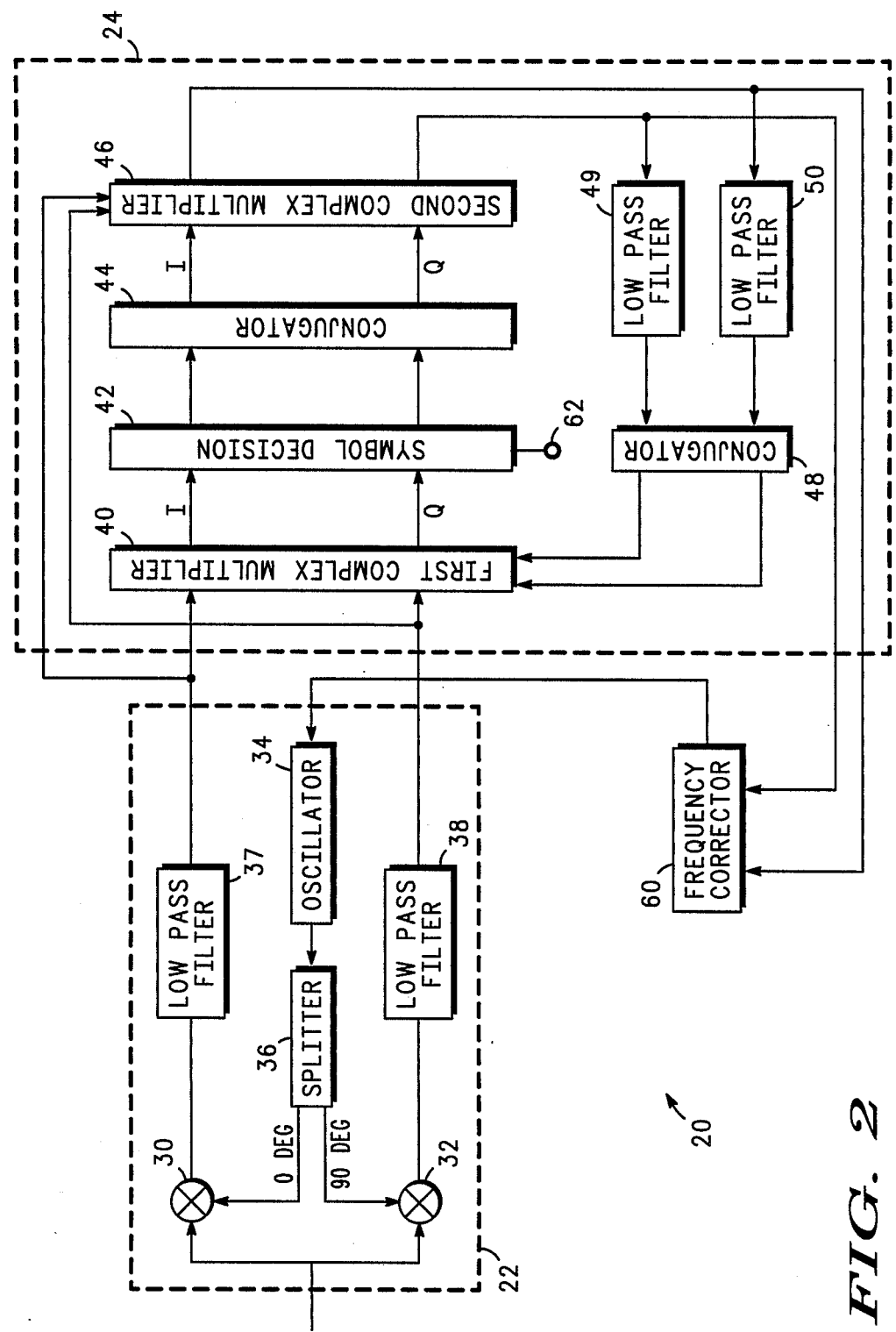
FIG. 2 is a schematic diagram of a baseband carrier phase corrector according to the present invention.

FIG. 1 shows what is known in the art as a Costas loop 10. Costas loop 10 is used in receivers to lock the receiver into phase with the carrier signal's phase or frequency after the carrier signal has been demodulated from RF (radio frequency) to IF (intermediate frequency) frequency. As with most conventional phase error correctors, Costas loop 10 comprises a phase lock loop 12. It is recognized in the art that phase lock loop 12 comprises VCO (voltage controlled oscillator) 14, multipliers 15, 16, and 17, and comparator 17. The operation of Costas loop 10 is explained in *DIGITAL COMMUNICATIONS AND SPREAD SPECTRUM SYSTEMS*, Rodger E. Ziemer and Roger L. Peterson, Macmillan Publishing Company, 1985.

A significant problem with Costas loop 10, as well as other phase corrector circuits incorporating phase locked loops, is the time delay inherent within phase locked loops. Specifically, the phase locked loop oscillator frequency and phase must be adjusted before demodulation can occur. Since relatively long periods of time are used in the phase locking sequence, information in short burst signals can be lost before demodulation occurs. Furthermore, high overhead occurs in the system due to long preambles attached to the data. Therefore, phase correctors incorporating phase locked loops are inefficient and ineffective for TDMA, and other short burst signals.

FIG. 2 shows a schematic of a baseband phase corrector 20. In its preferred embodiment, baseband phase corrector 20 comprises demodulator 22, phase corrector 24, and frequency corrector 60.

Demodulator 22 sets the reference, or demodulation, frequency which is mixed with the input RF or IF signal. The resultant output signals are in-phase (I) and quadrature (Q) signals at baseband. Specifically, a RF or IF signal is split between multipliers 30 and 32. Multipliers 30 and 32 are coupled to VCO 34 through splitter 36. VCO 34 supplies the reference frequency signal for demodulation. The reference frequency signals received by multipliers 30 and 32 from splitter 36 are out of phase 90 degrees. The 0 degree and 90 degree reference frequency signals are then mixed with the input signal in multipliers 30 and 32 to result in I and Q baseband signals. The I and Q baseband signals are filtered through low pass filters 37 and 38 and then output to phase corrector 24. The I and Q baseband signals will contain a phase error to be removed by phase corrector 24.

Phase corrector 24 comprises first complex multiplier 40, symbol decision circuit 42, first conjugator 44, second complex multiplier 46, second conjugator 48, and low pass filters 49 and 50. First complex multiplier 40 is coupled to low pass filters 37 and 38 to receive the I and Q baseband signals from demodulator 22. Symbol decision circuit 42 is coupled to first complex multiplier 40 to receive an output from first complex multiplier 40. Symbol decision circuit 42 then outputs a generated signal to second complex multiplier 46 through first conjugator 44. Second complex multiplier 46 is coupled to second conjugator 48 through low pass filters 49 and 50. Second conjugator 48 is coupled to first complex multiplier 40. Second complex multiplier 46 is coupled to low pass filters 37 and 38 of demodulator 22 to receive the I and Q baseband signals.

When the I and Q baseband signals are received by first complex multiplier 40 from demodulator 22, the I and Q signals are multiplied with the output of second conjugator 48. The output of second conjugator 48 is a conjugated average phase error for both I and Q. The output of first complex multiplier 40 is phase adjusted baseband signals for both I and Q channels. Symbol decision circuit 42 compares the output phase adjusted baseband signals with an allowable set of symbols stored within symbol decision circuit 42, and generates an estimated ideal signal. This process will be discussed in detail below.

The estimated ideal I and Q signals from symbol decision circuit 42 is conjugated in first conjugator 44 and relayed to secondmultiplier 46. The conjugated ideal signal is multiplied with the unadjusted I and Q baseband signals from demodulator 22. The product output of second multiplier 46 is averaged in low pass filters 49 and 50. The product output of second multiplier 46 is the average phase error which is conjugated in second conjugator 48 and output to first complex multiplier 40.

If the error rate of the unadjusted I and Q baseband signals is reasonably low, the difference between the estimated ideal I and Q signals from symbol decision circuit 42 and the unadjusted I and Q baseband signals will be approximately zero. The conjugated average phase error output from second conjugator 48 is then the conjugate of the average phase error of the unadjusted I and Q baseband signals. The phase error of the unadjusted I and Q baseband signals from demodulator 22 will then cancel out in one or two sumbols times locking phase corrector 24 onto the input signal phase quickly.

A frequency corrector 60 is shown in FIG. 2 coupled to the output of second multiplier 46, and further coupled to VCO 34 of demodulator 22. Frequency corrector 60 generates a frequency correction signal proportional to the angular velocity of the rotation of the phase error received from second multiplier 46. The generated frequency correction signal is relayed to VCO 34 to force VCO 34 to correct the demodulation frequency. It is important to realize that the frequency correction signal from frequency corrector 60 is not a phase correction signal. The frequency correction signal does not remove phase error within the uncorrected I and Q baseband signals. The frequency correction signal only corrects the VCO frequency, whereas phase corrector 24 removes the residual phase error. By separately correcting the frequency in demodulator 22, and the phase in phase corrector 24, baseband phase corrector 20 can demodulate the incoming RF signal with minimal time delays. This allows baseband phase corrector 20 to receive and demodulate short burst signals without losing information. Furthermore, by incorporating frequency corrector 60 within baseband phase corrector 20, the difference between the uncorrected I and Q baseband signals from demodulator 22 and the estimated ideal I and Q signals from symbol decision circuit 42 is very small. Very little time is required for phase locking.

The adjusted I and Q baseband signals (or channels) input to symbol decision circuit 42 are analog signals distorted from the original digital information signal carried on the input RF or IF signal. The I and Q baseband signals may initially contain a phase error which is to be removed by phase corrector 24. Symbol decision circuit 42 receives the analog signals and generates estimates of the original digital signal. To perform the symbol decision process the I and Q channels are treated as two vectors whose summation constitutes a point in the I, Q plane. Because of the analog nature of the I and Q signals, the vector summation of the I and Q signals may denote an infinite number of points in the plane. It is therefore necessary to reduce the sets of points to a discrete set of digital symbols by dividing the plane into sectors. Each point in a given sectoris assigned a single digital symbol. The number of sectors (symbols) depends on the modulation format. The symbol decision process then reduces to determining the sector in which the summation of the I and Q vectors fall. For purposes of example, the process is described below for three different modulation types: BPSK, QPSK, and 8PSK.

Since there are only two sectors for BPSK, only one bit (b0) is required to designate the correct sector. If the summation of the I and Q vectors falls within the right half plane, b0 is set to 1; if the summation falls within the left half plane, b0 is set to 0. A comparator (not shown but incorporated within symbol decision circuit 42) in the I channel with a threshold of 0 determines into which half of the plane the summation falls.

QPSK has four possible symbols and requires two bits (b0, b1). Both the I and Q channels require a comparator to assign the I, Q vector summation. The comparators determine whether the vector summation lies in the right or left half of the plane, and the upper or lower half of the plane. If the vector summation is in the right half, b0 is 1, and if in the left half, b0 is 0. If the vector summation is in the upper half, b1 is 1, and if in the lower half, b1 is 0.

The 8PSK modulation requires eight sectors. Bits b0 and b1 are determined in the same manner as QPSK. A third bit b2 is determined from the relative magnitudes of the I and Q vectors. If the magnitude of the Q vector is greater than the magnitude of the I vector, b2 is 1; if smaller, b2 is 0.

FIG. 3 shows the mathematical operation of the I and Q channels. The unadjusted baseband signal is represented by $e^{j(\phi+\beta)}$, where $\phi$ is the modulating signal and $\beta$ the phase error. This signal is then multiplied by the conjugated average phase error from second conjugator 48' within first complex multiplier 40'. The conjugated average phase error has a value of $e^{-j\beta'}$, and when multiplied with the unadjusted baseband signal, results in $e^{j(\phi+\beta-\beta')}$. Symbol decision circuit 42' evaluates this analog signal and generates the estimated ideal signal $e^{j\phi'}$. The estimated ideal signal is conjugated by first conjugator 44' resulting in $e^{-j\phi'}$. The conjugated signal is multiplied with the unadjusted baseband signal $e^{j(\phi+\beta)}$ in second complex multiplier 46' resulting in the averaged phase error. The averaged phase error is represented by $e^{j(\phi+\beta-\phi')}=e^{j\beta'}$. The averaged phase error is conjugated by second conjugator 48' resulting in the conjugated average phase error $e^{-j\beta'}$ being relayed to the first complex multiplier 40'.

Referring again to FIG. 2, when baseband phase corrector 20 locks in on the phase of the input IR or RF signal, the generated ideal signal is output at output 62 of symbol decision circuit 42. This output is a reconstruction of the original data used to modulate the RF carrier.

Thus there has been provided, in accordance with the present invention, a baseband carrier phase corrector that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

We claim:

1. A carrier phase corrector circuit comprising:
   baseband input means for supplying in-phase (I) and quadrature (Q) baseband modulated signals from an input signal having a given frequency and phase; said I and Q baseband modulated signals each including a respective phase error;
   first multiplier means, said first multiplier means coupled to said baseband input means to receive said I and Q baseband modulated signals;
   said first multiplier means outputting phase adjusted I and Q baseband signals;
   symbol decision means coupled to said first multiplier means to receive said phase adjusted baseband I and Q signals from said first multiplier;
   said symbol decision means for estimating digital I and Q signals corresponding to phase adjusted I and Q baseband signals;
   second multiplier means coupled to said symbol decision means to receive said digital I and Q signals, and further coupled to said baseband input means to receive said I and Q baseband modulated signals;
   said second multiplier means for generating a conjugated phase error from said digital I and Q signals and said I and Q baseband modulated signals;
   said first multiplier means coupled to said second multiplier means to receive said conjugated phase error;
   said first multiplier means for adjusting the phase error of said I and Q baseband modulated signals by said conjugated phase error multiplying with said I and Q baseband modulated signals;
   output means coupled to said symbol decision means; and
   said output means for outputting said digital I and Q signals when the carrier phase corrector circuit has locked onto said phase of said input signal.

2. A carrier phase corrector circuit according to claim 1 wherein said baseband input means comprises:
   input means for receiving a plurality of IF, or alternatively RF, signals;
   oscillator means for providing an oscillating signal;
   phase splitter means coupled to said oscillator means to receive said oscillating signal;
   said phase splitter means for dividing said oscillating signal into a plurality of oscillating signals, said plurality of oscillating signals having a difference in phase of 90 degrees;
   a plurality of multiplier means coupled to said phase splitter means to receive said plurality of oscillating signals, said plurality of multiplier means further coupled to said input means to receive said IF or alternatively said RF signals;
   said pluraliity of multiplier means for modulating said plurality of IF or alternatively said RF signals with said plurality of oscillating signals;
   said plurality of multiplier means generating said I and Q baseband modulated signals; and
   said plurality of multiplier means further coupled to said first multiplier means to provide said I and Q baseband modulated signals to said first multiplier means.

3. A carrier phase corrector circuit according to claim 2 wherein the carrier phase corrector circuit further comprising:
   frequency corector means coupled to said second multiplier means;
   said frequency corrector means for generating a frequency correction signal proportional to an angular velocity of a rotation of said conjugate phase error;
   said frequency corrector means further coupled to said oscillator means to supply said frequency correction signal to said oscillator means; and
   said frequency corrector means adjusting said oscillating signal of said oscillator means.

4. A carrier phase corrector circuit according to claim 1 wherein said second multiplier means comprises:
   first conjugator means coupled to said symbol decision means to receive said digital I and Q signals;
   said first conjugator means for conjugating said digital I and Q signals;

complex multiplier means coupled to said first conjugator means to receive said conjugated digital I and Q signals, and further coupled to said baseband input means to receive said I and Q baseband modulated signals;

said complex multiplier means for generating a phase error by multiplying said digital I and Q signals with said I and Q baseband modulated signals;

second conjugator means for conjugating said phase error to produce said conjugated phase error;

said second conjugator means coupled to said complex multiplier means to receive said complex multiplier output; and said second conjugator means further coupled to said first multiplier means to supply said conjugated phase error to said first multiplier means.

5. A method of demodulating and phase correcting an input IF or RF signal comprising the steps of:

receiving an input IF, or alternatively a RF, signal;

splitting said input IF, or alternatively RF, signal into a plurality of signals and relaying said plurality of signals to a plurality of multipliers;

supplying a plurality of oscillating signals having a 90 degree phase differential to said plurality of multipliers;

generating in-phase (I) and quadrature (Q) baseband modulated signals withing said plurality of multipliers from said plurality of oscillating signals and said input IF, or alternatively RF, signal;

relaying said I and Q baseband modulated signals to a first complex multiplier;

supplying I and Q conjugated phase errors to said first complex multiplier and multiplying said I and Q baseband modulated signals with said I and Q conjugated phase errors to produce phase adjusted I and Q baseband signals;

relaying said phase adjusted I and Q baseband signals to a symbol decision circuit;

estimating within said symbol decision circuit I and Q digital signals corresponding to said corrected I and Q baseband signals;

relaying said estimated I and Q digital signals to a second complex multiplier and receiving said I and Q baseband modulated signals from said plurality of multipliers;

multiplying within said second complex multiplier said estimated I and Q digital signals with said I and Q baseband modulated signals to generate a phase error;

conjugating said phase error to generate said conjugated phase error;

relaying said conjugated phase error to said first complex multiplier;

repeating the step of multiplying said I and Q baseband modulated signals with said I and Q conjugated phase errors, and subsequent steps, until said phase adjusted I and Q baseband signals are approximately equal to said estimated I and Q digital signals; and outputting said estimated I and Q digital signals to a host circuit when said phase adjusted I and Q digital signals approximately equals said estimated I and Q digital signals.

6. A method of demodulating and phase correcting an input IF or RF signal according to claim 5 wherein said method further comprises:

relaying a portion of said conjugated I and Q phase errors to a frequency corrector;

determining an angular velocity of rotation of said I and Q conjugated phase errors;

generating a frequency correction signal within said frequency corrector from said angular velocity;

said frequency correction signal being proportional to said angular velocity; and controlling the frequency of said plurality of oscillating signals by supplying said frequency correction signal to an oscillating source generating said plurality of oscillating signals.

* * * * *

UNITED STATES PATENT AND TRADEMARK OFFICE
CERTIFICATE OF CORRECTION

PATENT NO.   : 4,943,982

DATED        : July 24, 1990

INVENTOR(S)  : Vernon P. O'Neill, II et al.

It is certified that error appears in the above-identified patent and that said Letters Patent is hereby corrected as shown below:

In column 6, claim 1, line 15, delete "error".

Signed and Sealed this

Twenty-sixth Day of January, 1993

Attest:

DOUGLAS B. COMER

*Attesting Officer*              *Acting Commissioner of Patents and Trademarks*